United States Patent [19]

Shin et al.

[11] Patent Number: 5,560,786

[45] Date of Patent: Oct. 1, 1996

[54] MAGNETIC THIN FILM MATERIAL FOR MAGNETIC RECORDING

[75] Inventors: Kyung H. Shin; Taek D. Lee; Hong G. Sohn, all of Seoul; Pyung W. Chang, Choongchungbuk-do; Chang M. Park, Seoul, all of Rep. of Korea

[73] Assignee: Korea Institute of Science and Technology, Seoul, Rep. of Korea

[21] Appl. No.: 519,727

[22] Filed: Aug. 28, 1995

[30] Foreign Application Priority Data

Aug. 31, 1994 [KR] Rep. of Korea .................. 94-21749

[51] Int. Cl.$^6$ ........................................ H01F 1/04
[52] U.S. Cl. ................. 148/313; 420/435; 420/436
[58] Field of Search ..................... 148/313; 420/435, 420/436

[56] References Cited

U.S. PATENT DOCUMENTS

| | | | |
|---|---|---|---|
| 2,200,742 | 5/1940 | Hardy | 420/435 |
| 3,578,571 | 5/1971 | McQuaid et al. | 420/435 |
| 5,004,652 | 4/1991 | Lal et al. | 428/611 |
| 5,049,451 | 9/1991 | Lal et al. | 428/611 |
| 5,057,200 | 10/1991 | Lal et al. | 204/142.15 |

FOREIGN PATENT DOCUMENTS 59-219907  12/1984  Japan ...................... 148/313
4-221418   8/1992   Japan .

OTHER PUBLICATIONS

IEEE Transactions on Magnetics, vol. 28, No. 5, Sep. 1992, pp. 3084–3086, C. R. Paik, et al., "Magnetic Properties and Noise Characteristics of High Coercivity CoCrPtB/Cr Media".

*Primary Examiner*—John Sheehan
*Attorney, Agent, or Firm*—Oblon, Spivak, McClelland, Maier & Neustadt, P.C.

[57] ABSTRACT

Novel thin film materials comprised of certain Co-based alloys containing phosphorous, i.e., Co-Cr-P-Pt or Co-Cr-P-Ni alloy, which can provide a high coercive force and a high squareness ratio are disclosed. These magnetic thin film alloys exhibit excellent magnetic properties without heating the substrate or applying bias thereto during the film formation and when glass is used for the substrate as well as an Al alloy disk.

2 Claims, 5 Drawing Sheets

MAGNETIC THIN FILM MATERIAL FOR MAGNETIC RECORDING

BACKGROUND OF THE INVENTION

1. Field of the Invention

The present invention relates to a cobalt-based magnetic thin film material which can be used for high-density magnetic recording devices. More particularly, the present invention relates to a thin film material consisting of certain Co-based alloys containing phosphorous, such as Co-Cr-P-Pt or Co-Cr-P-Ni alloy, which can provide a high coercive force and a high squareness ratio.

2. Description of the Prior Art

In recent years, much efforts have been made for achieving higher recording density in the fields of magnetic recording and reproduction devices such as computer hard disk drives and VTRs. This has resulted in a demand for recording media having a higher coercive force and appearing in the form of an ultra-thin film. Attempts have also been made to improve the signal to noise ratio.

Conventionally, cobalt-based alloys have mainly been used as thin film materials for magnetic recording devices. Co-Cr-Ta alloys are most frequently employed as magnetic thin film materials for hard disks.

To enhance the coercive force of thin films formed from these materials, a substrate is usually heated to a temperature above 200° C. before sputtering or vapor deposition is initiated to form a thin film on it. Also, bias is often applied to the substrate during sputtering or vapor deposition. However, the coercive force of a thin film formed from the above materials is about 1600 Oersted (Oe) for heated substrates, and at most 1800 Oe for heated substrate to which biasing has been applied.

The above methods for enhancing coercive force of magnetic thin films have some problems. In the substrate heating method, elevation of the substrate temperature is limited due to the risk that the substrate will be distorted or the noncrystalline Ni-P layer will be crystallized by the heating in the case of Al substrates. In the substrate bias method, the substrate is restricted since it must be an electrically conductive material. Glass and ceramics are considered the most preferable substrate material for hard disks for high density magnetic recording devices. Both are electrically nonconductive materials, and thus the substrate bias method is not suitable for preparing a magnetic thin film having a high coercive force using a substrate comprised of these materials.

The recent trend is toward reducing the distance between the head and the recording medium of a magnetic recording device in order to compensate for the lowering of reproduced signals expected from the reduction of residual magnetic flux x magnetic layer thickness ($M_r \cdot t$) for increasing recording density. Flatness of the substrate is very important in this context. Therefore, it is expected that substrates comprised of glass or ceramics will be incorporated since they are superior to those comprised of Al alloys in maintaining flatness. Furthermore, Al alloy disks presently have been getting thinner in general, so that the possibility of distortion by heating is increased.

Co-Cr-Pt and Co-Cr-Pt-Ta are the magnetic thin film materials which can provide coercive forces above 1800 Oe. However, these materials have the disadvantages that they contain a substantial amount of an expensive metal, Pt, and their large crystallite size and poor separation between crystals causes high noise when they are formed into a thin film for magnetic recording devices.

Japanese Ko-Kai (Hei) 4-221418 and IEEE Trans. Magn., Vol. 28, No. 5, p 3084 (1992) disclose a magnetic thin film comprised of Co-Cr-Pt-B. This film has problems that high coercive force is obtained only when the substrate is heated to a high temperature and bias is applied to it during the formation of the thin film. Thus, the manufacturing process is complex and a high coercive force cannot be obtained when substrates made of glass or the like are used.

SUMMARY OF THE INVENTION

The inventors have conducted extensive research to solve the above prior art problems and found that a thin film formed by sputtering or vapor deposition of certain Co-based alloys containing phosphorous, i.e., Co-Cr-P-Pt or Co-Cr-P-Ni alloy on a substrate gives high coercive force without heating of the substrate during the film formation. It was also found that these alloys are advantageous when glass or the like is used for the substrate as well as Al alloy disks.

It is therefore an object of the invention to provide a Co-based magnetic thin film alloy which can be produced by a simple and convenient process and possess good magnetic properties such as a high coercive force and a high squareness ratio without involving the problems encountered in using previously known materials.

These and other objects, features and advantages of the present invention will be apparent from the following description.

In summary, the present invention provides a magnetic thin film alloy for magnetic recording devices having the following composition:

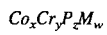

$$Co_xCr_yP_zM_w$$

wherein:

M is platinum (Pt) or nickel (Ni);

x is 60 to 90 atomic %;

y is 0 to 13 atomic %;

z is 1 to 15 atomic %;

w is 0 to 30 atomic %; and x+y+z+w=100.

BRIEF DESCRIPTION OF THE DRAWINGS

The present invention will be illustrated by the accompanying drawings, wherein.

DETAILED DESCRIPTION OF THE INVENTION

According to the present invention, a magnetic thin film alloy for magnetic recording devices having the following composition is provided:

$$Co_xCr_yP_zM_w$$

wherein:

M is platinum (Pt) or nickel (Ni);
x is 60 to 90 atomic %;
y is 0 to 13 atomic %;
z is 1 to 15 atomic %;
w is 0 to 30 atomic %; and
x+y+z+w=100.

A particularly preferred thin film alloy in accordance with the invention is one wherein M is platinum (Pt), x is 61 to 85 atomic %, y is 2 to 12 atomic %, z is 5 to 12 atomic %, w is 8 to 15 atomic %, and x+y+z+w=100.

Figure 4:
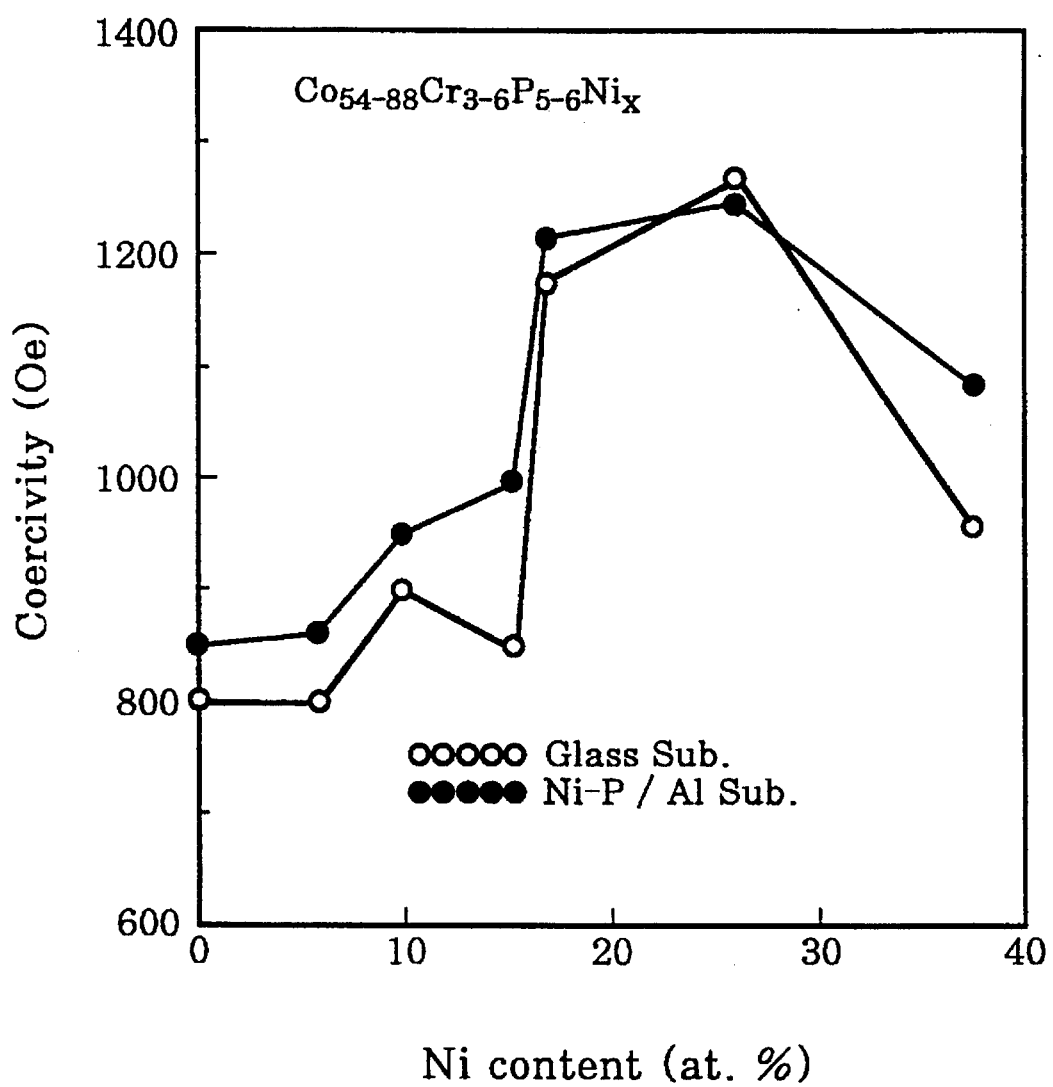
FIG. 4 shows changes in the coercive force (Hc) depending on the Ni content of the Co-Cr-P-Ni thin film alloy of the present invention prepared on Ni-P/Al and glass substrates.
Figure 5:
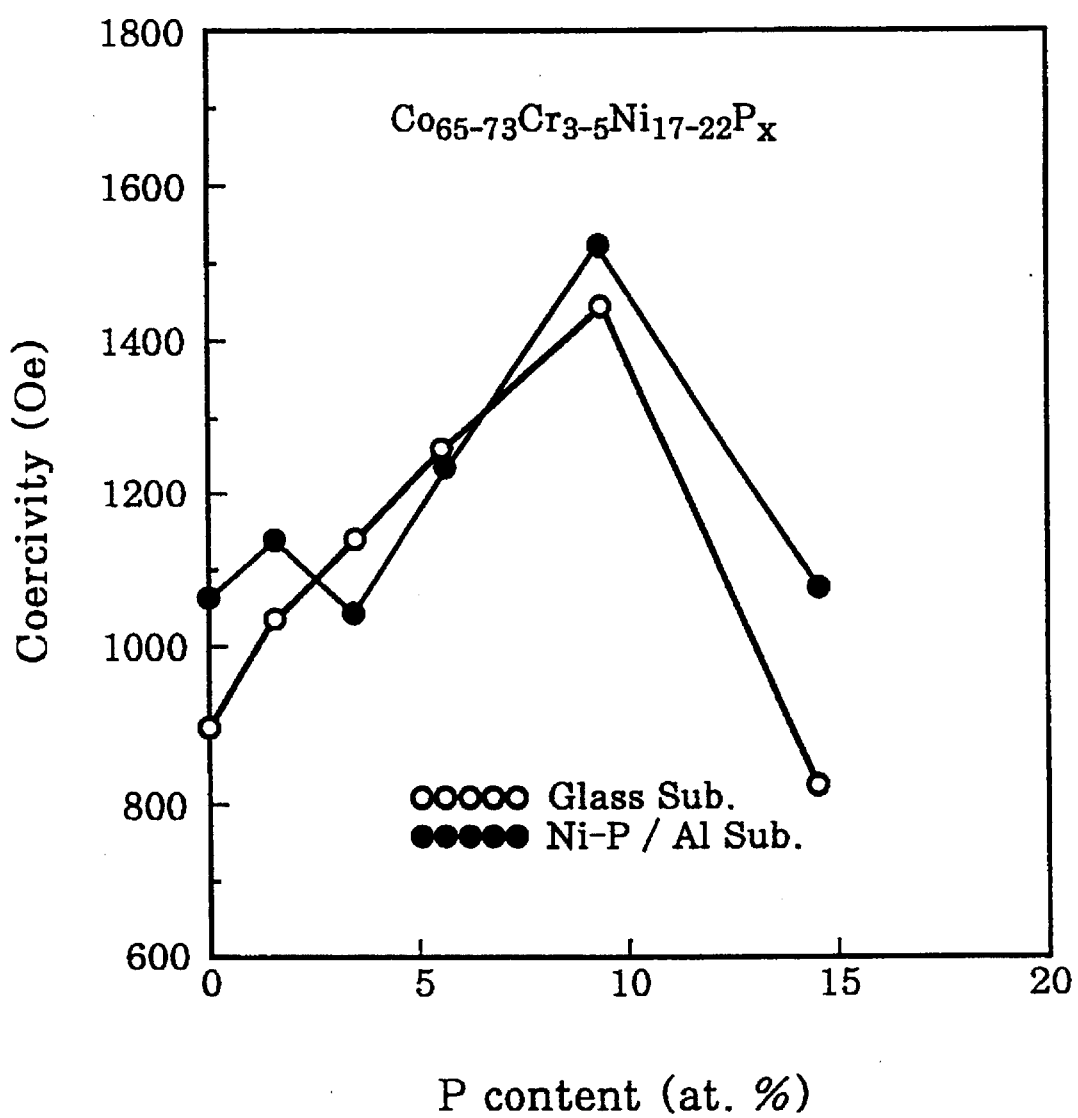
FIG. 5 shows changes in the coercive force (Hc) depending on the P content of the Co-Cr-P-Ni thin film alloy of the present invention prepared on Ni-P/Al and glass substrates.

The magnetic thin film alloy for magnetic recording devices according to the present invention gives a high coercive force and a high squareness ratio. Even without adding expensive Pt, a coercive force of about 1200 Oe is obtained when Ni content is in the range of from 20 to 30 atomic %, and a coercive force of about 1500 Oe is obtained when P content is about 9 atomic % as shown in FIGS. 4 and 5.

The compositions and the coercive force of a magnetic thin film have an intimate correlation as shown in Tables 1, 2, 4 and 5 below. The effect of each component on the coercive force of the film varies with the types of the individual components. The effect of P on the increase of the coercive force is identical to or better than that of Ni or Pt. It is a distinctive advantage of the present invention that such operations as heating the substrate or applying bias during the film formation are not required to accomplish the effect of addition of P.

The Co-Cr-P-(Pt, Ni) thin film alloy for magnetic recording devices according to the present invention is produced by a sputtering or vapor deposition processes. When the thin film is formed by sputtering, this sputtering can be performed by a DC or a high frequency AC sputtering apparatus using an alloy target or composite target technique or simultaneous sputtering technique. The DC sputtering technique can be used for electrically conductive materials only, whereas the high frequency AC sputtering technique can be used for electrically nonconductive materials. The DC sputtering apparatus is advantageous in view of cost and safety.

The thin film alloy for magnetic recording devices according to the present invention can be formed into a thin film under conditions where the substrate is at room temperature without applying bias thereto. However, it is possible to form the thin film with heating the substrate and/or applying bias thereto.

Figure 1:
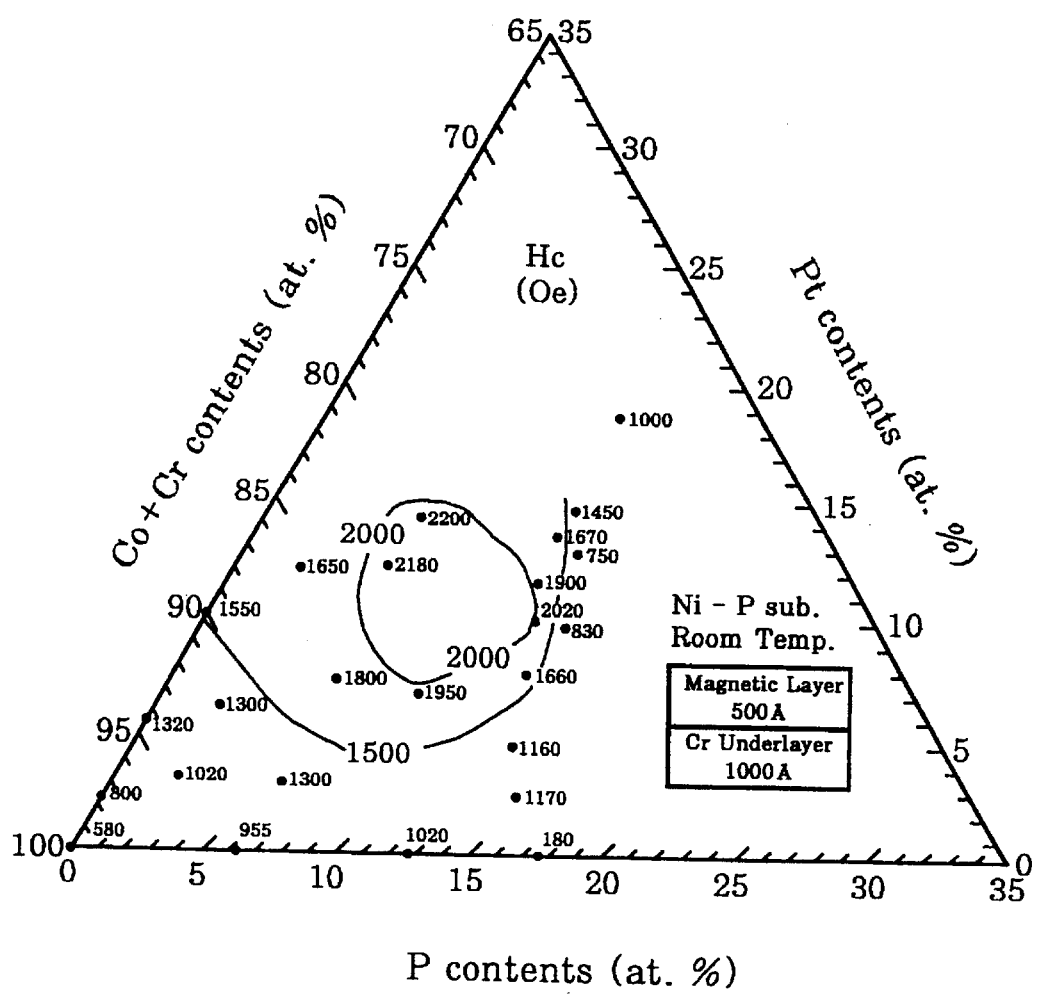
FIG. 1 shows changes in the coercive force (Hc) depending on the composition of the Co-Cr-P-Pt thin film alloy of the present invention prepared on Ni-P/Al substrates.
Figure 2:
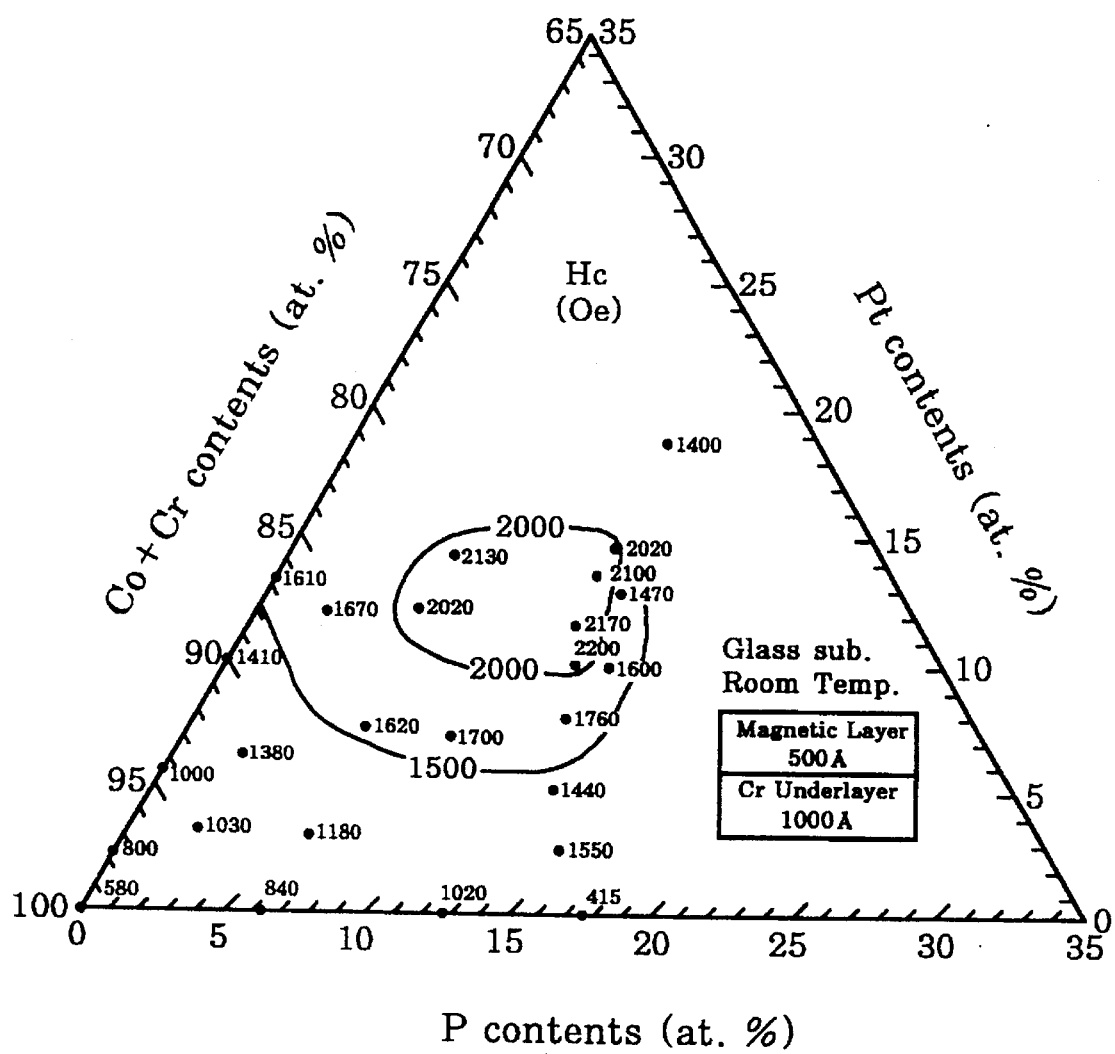
FIG. 2 shows changes in the coercive force (Hc) depending on the composition of the Co-Cr-P-Pt thin film alloy of the present invention prepared on glass substrates.

As shown in FIGS. 1 and 2, magnetic thin films with various compositions according to the present invention can provide a coercive force higher than 2000 Oe in a relatively wide range without applying bias to the substrate or without heating the substrate during the film formation. This makes it possible to employ a novel substrate in addition to conventional substrates such as a Ni-P plated Al disk and a glass substrate which is not suitable for applying bias thereto.

Figure 3:
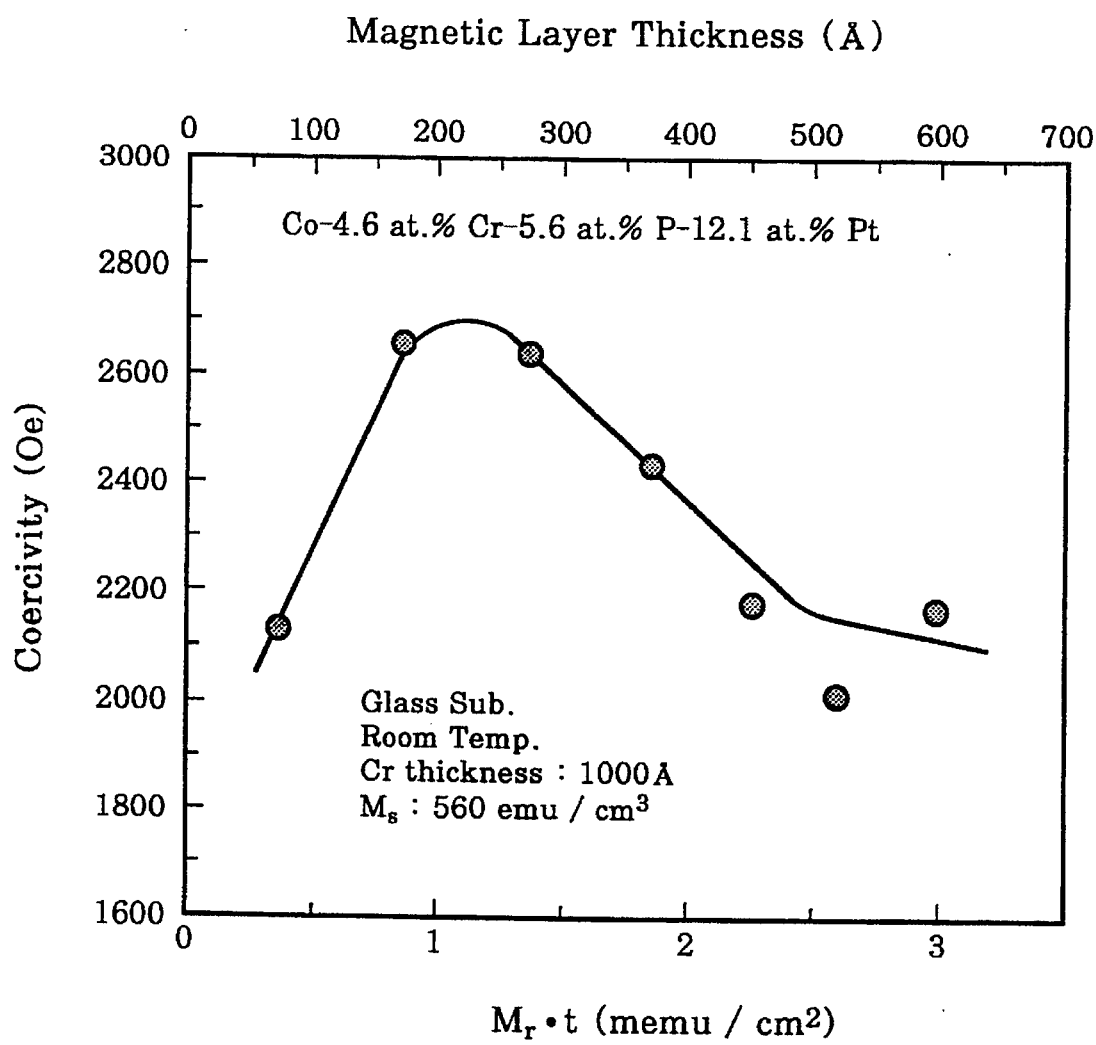
FIG. 3 shows changes in the coercive force (Hc) depending on the thickness of the Co-Cr-P-Pt thin film alloy of the present invention prepared on glass substrates.

As the recording density is increased, magnetic films are generally required to have a higher coercive force and a smaller thickness. The magnetic thin film according to the present invention exhibits a coercive force of 2000 Oe or more at a thickness as low as 100 Å as shown in FIG. 3.

DESCRIPTION OF THE PREFERRED EMBODIMENTS

The present invention will be illustrated in greater detail by way of the following examples. The examples are presented for illustration purpose only and should not be construed as limiting the invention, which is properly delineated in the claims.

EXAMPLE 1

Co-Cr-P-Pt thin films with various compositions were formed on Ni-P plated Al substrates using a DC magnetron sputtering apparatus (a product of Shin-Young Hi-Tech Co., Korea, or Model SPF-312H available from ANELVA Co., Japan). Here, a Cr layer of 1000 Å in thickness was used as the underlying layer. During the sputtering, gas pressure was maintained at 10 miliTorr, and the substrate was at room temperature. The thickness of the magnetic layer was 500 Å. Characteristics of the thin films prepared by this method are shown in Table 1. Changes in the coercive force (Hc) depending on the composition of each Co-Cr-P-Pt thin film are shown in FIG. 1. These characteristics were measured by a VSM (Vibrating Sample Magnetometer).

TABLE 1

| Sample No. | Composition (atomic %) | | | | Coercive force (Oe) | Squareness ratio | Coercive force squareness ratio |
|---|---|---|---|---|---|---|---|
| | Co | Cr | P | Pt | | | |
| 1 | 84.1 | 5.8 | 0 | 10.1 | 1550 | 0.89 | 0.87 |
| 2 | 80.6 | 5.0 | 2.4 | 12.0 | 1650 | 0.88 | 0.88 |
| 3 | 77.7 | 4.6 | 5.6 | 12.1 | 2180 | 0.90 | 0.83 |
| 4 | 73.5 | 3.5 | 11.5 | 11.5 | 1950 | 0.88 | 0.79 |
| 5 | 74.3 | 3.5 | 12.2 | 10.0 | 2020 | 0.85 | 0.82 |
| 6 | 88.6 | 5.2 | 6.2 | 0 | 955 | 0.61 | 0.67 |
| 7 | 85.2 | 5.3 | 6.3 | 3.1 | 1300 | 0.86 | 0.85 |
| 8 | 81.6 | 4.9 | 6.1 | 7.4 | 1820 | 0.82 | 0.81 |
| 9 | 75.8 | 4.2 | 5.8 | 14.2 | 2200 | 0.83 | 0.80 |
| 10 | 70.4 | 12.0 | 5.6 | 12.0 | 1920 | 0.86 | 0.79 |

As can be seen from the above table, coercive forces of above 2000 Oe are obtained over a wide range of composition without heating the substrate or applying bias thereto during the film formation..

EXAMPLE 2

Co-Cr-P-Pt thin films with various compositions were formed on glass substrates using a DC or a high frequency AC magnetron sputtering apparatus. Here, a Cr layer of 1000 Å in thickness was used as the underlying layer. During the sputtering, gas pressure was maintained at 10 miliTorr, and the substrate was at room temperature. The thickness of the magnetic layer was 500 Å. Characteristics of the thin films prepared by this method are shown in Table 2. Changes in the coercive force (Hc) depending on the composition of each Co-Cr-P-Pt thin film are shown in FIG. 2. These characteristics were measured by a VSM.

TABLE 2

| Sample No. | Composition (atomic %) | | | | Coercive force (Oe) | Squareness ratio | Coercive force squareness ratio |
| --- | --- | --- | --- | --- | --- | --- | --- |
| | Co | Cr | P | Pt | | | |
| 11 | 84.1 | 5.8 | 0 | 10.1 | 1410 | 0.87 | 0.88 |
| 12 | 80.6 | 5.0 | 2.4 | 12.0 | 1670 | 0.88 | 0.85 |
| 13 | 77.7 | 4.6 | 5.6 | 12.1 | 2020 | 0.90 | 0.83 |
| 14 | 73.5 | 3.5 | 11.5 | 11.5 | 2170 | 0.86 | 0.81 |
| 15 | 74.3 | 3.5 | 12.2 | 10.0 | 2200 | 0.87 | 0.79 |
| 16 | 88.6 | 5.2 | 6.2 | 0 | 840 | 0.68 | 0.76 |
| 17 | 85.2 | 5.3 | 6.3 | 3.1 | 1180 | 0.88 | 0.85 |
| 18 | 81.6 | 4.9 | 6.1 | 7.4 | 1620 | 0.88 | 0.85 |
| 19 | 75.8 | 4.2 | 5.8 | 14.2 | 2130 | 0.86 | 0.81 |
| 20 | 70.4 | 12.0 | 5.6 | 12.0 | 1930 | 0.82 | 0.78 |

As can be seen from the above table, coercive forces of above 2000 Oe are obtained over a wide range of composition when a glass substrate, which is not a suitable material for heating the substrate or applying bias thereto, is used.

EXAMPLE 3

Co-Cr-P-Pt thin films having various thickness were formed on glass substrates using a DC magnetron sputtering apparatus. Here, a Cr layer of 1000 Å in thickness was used as the underlying layer. During the sputtering, gas pressure was maintained at 10 miliTorr, and the substrate was at room temperature. The magnetic layer contained 77.7 atomic % Co, 4.6 atomic % Cr, 5.6 atomic % P, and 12.1 atomic % Pt. Characteristics of the thin films prepared by this method are shown in Table 3. Changes in the coercive force (Hc) depending on the thickness of these Co-Cr-P-Pt thin films are shown in FIG. 3. These characteristics were measured by a VSM.

TABLE 3

| Sample No. | Thickness of magnetic thin film (Å) | Coercive force (Oe) | Squareness ratio | Coercive force squareness ratio |
| --- | --- | --- | --- | --- |
| 21 | 90 | 2100 | 0.89 | 0.54 |
| 22 | 180 | 2640 | 0.88 | 0.73 |
| 23 | 280 | 2630 | 0.89 | 0.78 |
| 24 | 390 | 2430 | 0.88 | 0.77 |
| 25 | 500 | 2180 | 0.86 | 0.81 |
| 26 | 610 | 2180 | 0.89 | 0.81 |

As can be seen from the above table, a coercive force of above 2000 Oe is obtained even with a thickness as small as 100 Å.

EXAMPLE 4

Co-Cr-P-Ni thin films with various compositions were formed on Ni-P plated Al substrates using a DC magnetron sputtering apparatus. Here, a Cr layer of 1000 Å in thickness was used as the underlying layer. During the sputtering, gas pressure was maintained at 10 miliTorr, and the substrate was at room temperature. The thickness of the magnetic layer was 500 Å. Characteristics of the thin films prepared by this method are shown in Table 4. Changes in the coercive force (Hc) depending on the composition of each Co-Cr-P-Ni thin film are shown in FIGS. 4 and 5. These characteristics were measured by a VSM.

TABLE 4

| Sample No. | Composition (atomic %) | | | | Coercive force (Oe) | Squareness ratio | Coercive force squareness ratio |
| --- | --- | --- | --- | --- | --- | --- | --- |
| | Co | Cr | Ni | P | | | |
| 27 | 73.0 | 5.3 | 21.7 | 0 | 1070 | 0.78 | 0.81 |
| 28 | 70.5 | 4.8 | 23.1 | 1.6 | 1150 | 0.68 | 0.73 |
| 29 | 69.8 | 4.6 | 22.1 | 3.5 | 1050 | 0.78 | 0.65 |
| 30 | 64.2 | 4.3 | 26.0 | 5.5 | 1250 | 0.80 | 0.71 |
| 31 | 65.1 | 3.6 | 22.0 | 9.3 | 1540 | 0.73 | 0.66 |
| 32 | 65.2 | 2.9 | 17.4 | 14.5 | 1090 | 0.72 | 0.60 |
| 33 | 88.1 | 5.6 | 0 | 6.3 | 850 | 0.70 | 0.74 |
| 34 | 82.9 | 5.6 | 5.8 | 5.7 | 860 | 0.73 | 0.76 |
| 35 | 78.4 | 5.5 | 9.8 | 6.3 | 950 | 0.77 | 0.79 |
| 36 | 74.2 | 5.0 | 15.1 | 5.7 | 1000 | 0.78 | 0.80 |
| 37 | 72.7 | 5.2 | 16.6 | 5.5 | 1220 | 0.80 | 0.79 |
| 38 | 53.7 | 3.3 | 37.4 | 5.6 | 1090 | 0.81 | 0.71 |

EXAMPLE 5

Co-Cr-P-Ni thin films with various compositions were formed on glass substrates using a DC magnetron sputtering apparatus. Here, a Cr layer of 1000 Å in thickness was used as the underlying layer. During the sputtering, gas pressure was maintained at 10 miliTorr, and the substrate was at room temperature. The thickness of the magnetic layer was 500 Å. Characteristics of the thin films prepared by this method are shown in Table 5. Changes in the coercive force (Hc) depending on the composition of Co-Cr-P-Ni thin films is shown in FIGS. 4 and 5. These characteristics were measured by a VSM.

TABLE 5

| Sample No. | Composition (atomic %) | | | | Coercive force (Oe) | Squareness ratio | Coercive force squareness ratio |
| --- | --- | --- | --- | --- | --- | --- | --- |
| | Co | Cr | Ni | P | | | |
| 39 | 73.0 | 5.3 | 21.7 | 0 | 900 | 0.81 | 0.88 |
| 40 | 70.5 | 4.8 | 23.1 | 1.6 | 1040 | 0.80 | 0.78 |
| 41 | 69.8 | 4.6 | 22.1 | 3.5 | 1150 | 0.80 | 0.76 |
| 42 | 64.2 | 4.3 | 26.0 | 5.5 | 1270 | 0.88 | 0.83 |
| 43 | 65.1 | 3.6 | 22.0 | 9.3 | 1460 | 0.79 | 0.79 |
| 44 | 65.2 | 2.9 | 17.4 | 14.5 | 830 | 0.76 | 0.84 |
| 45 | 88.1 | 5.6 | 0 | 6.3 | 800 | 0.83 | 0.73 |
| 46 | 82.9 | 5.6 | 5.8 | 5.7 | 800 | 0.81 | 0.83 |
| 47 | 78.4 | 5.5 | 9.8 | 6.3 | 900 | 0.83 | 0.83 |
| 48 | 74.2 | 5.0 | 15.1 | 5.7 | 850 | 0.85 | 0.85 |
| 49 | 72.7 | 5.2 | 16.6 | 5.5 | 1180 | 0.83 | 0.82 |
| 50 | 53.7 | 3.3 | 37.4 | 5.6 | 960 | 0.88 | 0.73 |

From FIGS. 4 and 5, it can be seen that high coercive force is obtained when Ni content is 20 to 30 atomic % and coercive force rises as P content is increased so that a relatively high coercive force of 1500 Oe is obtained without addition of expensive Pt at a P content of 9 atomic %.

COMPARATIVE EXAMPLE 1

A Co-Cr-Pt-Ta thin film was formed by sputtering under an Ar atmosphere using a Co-Cr-Pt-Ta alloy target with heating of the substrate. See U.S. Pat. Nos. 5,004,652, 5,049,451 and 5,057,200. Characteristics of the thin film produced by this method are shown in Table 6.

TABLE 6

| Composition (atomic %) | | | | Thickness of thin film (Å) | Temperature of substrate (°C.) | Coercive force (Oe) |
|---|---|---|---|---|---|---|
| Co | Cr | Pt | Ta | | | |
| 75 | 12 | 10 | 3 | 200 | 200 | 1470 |
| | | | | 200 | 270 | 1990 |
| | | | | 600 | 200 | 1420 |
| | | | | 600 | 270 | 1680 |

Comp. Exam. No. 1

COMPARATIVE EXAMPLE 2

A Co-Cr-Pt-B thin film was formed on a Ni-P plated Al substrate by sputtering under Ar atmosphere using a Co target having particles of Cr, Pt and B placed thereon. The substrate was heated to 280° C. and a bias of −300 V was applied thereto during the sputtering. See Japanese Ko-Kai (Hei) 4-221418 and IEEE Trans. Magn., Vol. 28, No. 5, p 3084 (1992). Characteristics of the thin film produced by this method are shown in Table 7.

TABLE 7

| Composition (atomic %) | | | | Bias (V) | Temperature of substrate (°C.) | Coercive force (Oe) |
|---|---|---|---|---|---|---|
| Co | Cr | Pt | B | | | |
| 70 | 10 | 10 | 10 | −300 | 280 | 3200 |

Comp. Exam. No. 2

The above results indicate that the magnetic thin films for magnetic recording devices according to the present invention are superior to those of the prior art in view of their manufacturing process and magnetic properties. Particularly, the magnetic thin films according to the present invention can provide a high coercive force even when they are very thin and are formed on a substrate at room temperature.

It should be understood that those skilled in the art would recognize various modifications and adaptations of the composition and the manufacturing process within the spirit and scope of the present invention.

What is claimed is:

1. A magnetic thin film alloy for magnetic recording devices having the following composition:

$$Co_xCr_yP_zPt_w$$

wherein: x is 61–85 atomic %; y is 2–12 atomic %; z is 5–12 atomic %; w is 8–15 atomic % and x+y+z+w=100%.

2. A magnetic thin film alloy for magnetic recording devices having the following composition:

$$Co_xCr_yP_zNi_w$$

wherein: x is 64.2–82.9 atomic %; y is 2.9–13 atomic %; z is 1.6–15 atomic %; w is 5.8–30 atomic %; and x+y+z+w=100%.

* * * * *